Sept. 6, 1949.   E. V. FRANCIS   2,481,101
FEEDING APPARATUS
Filed Oct. 9, 1945
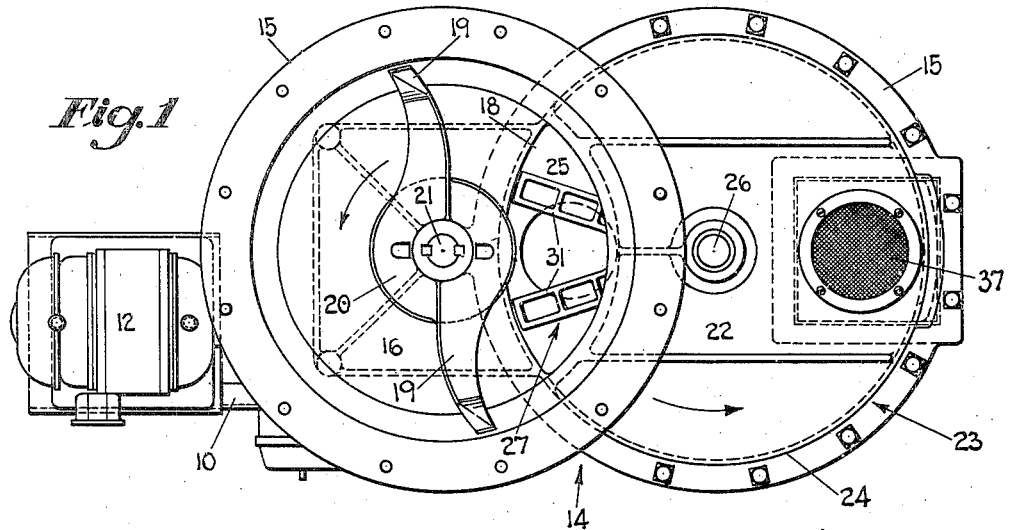
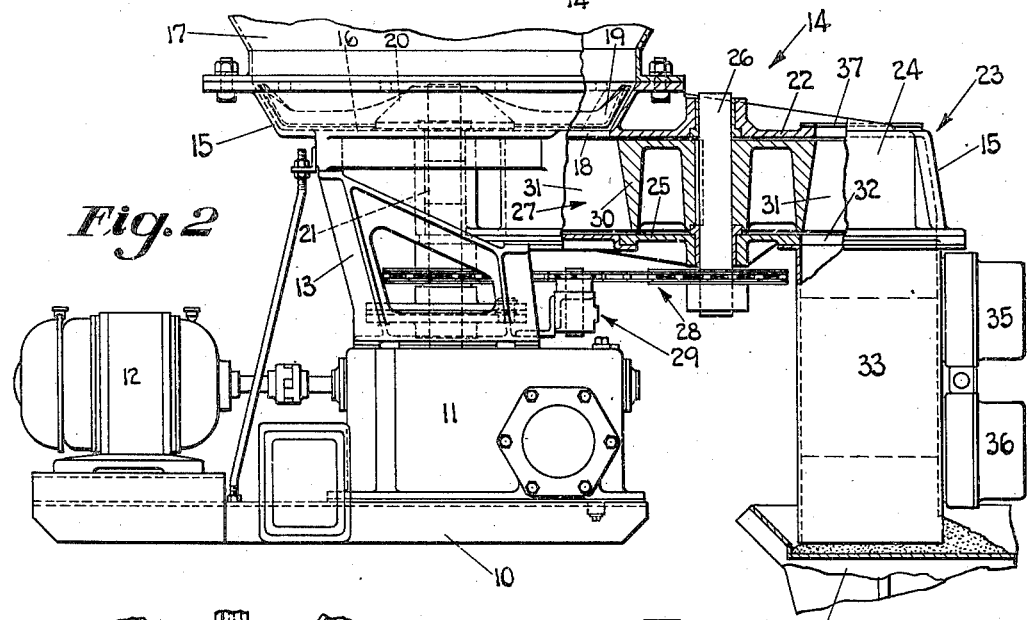
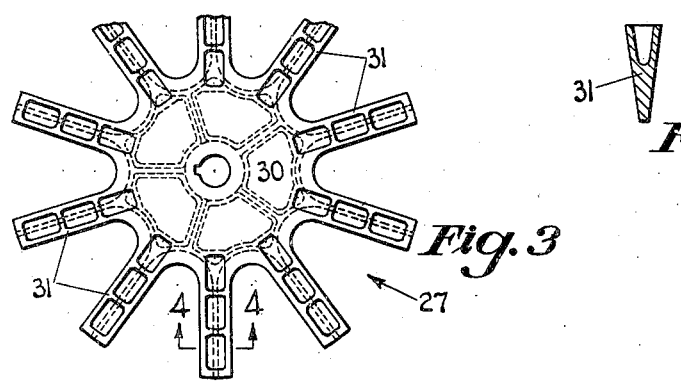
INVENTOR:
EARLE V. FRANCIS,
BY *Harken H. Nitham*,
ATTY.

Patented Sept. 6, 1949

2,481,101

UNITED STATES PATENT OFFICE 2,481,101

FEEDING APPARATUS

Earle V. Francis, Columbus, Ohio, assignor to The Jeffrey Company, a corporation of Ohio Application October 9, 1945, Serial No. 621,304

2 Claims. (Cl. 222—56)

This invention relates to a feeding apparatus particularly adapted to feed fine granular material which tends to run.

An object of the invention is to provide improved feeding apparatus of the above mentioned type.

A more specific object of the invention is to provide a combination stirring and feeding apparatus driven by a common driving means in which the axes of rotation of said device are offset laterally and in which the feeding apparatus discharges material to a receptacle or chute which has substantially upright side walls.

Another object of the invention is to provide feeding apparatus of the above mentioned type with breather means to assist in the discharge of material.

Still another object of the invention is to provide feeding apparatus of the above mentioned type in which a rotary radial arm scraper feeder is employed, the arms of which taper to aid in discharge of material.

Other objects of the invention will appear hereinafter, the novel features and combinations being set forth in the appended claims.

In the accompanying drawings,

Fig. 1 is a plan view of a feeder incorporating the structure of my invention;

Fig. 2 is a side elevational view of the feeder together with the associated storage hopper and associated conveyor deck;

Fig. 3 is a plan view of a portion of the rotor or spider of the feeder; and

Fig. 4 is a sectional view taken on the line 4—4 of Fig. 3, looking in the direction of the arrows.

The invention herein disclosed and claimed constitutes an improvement over the feeding apparatus of my Patent No. 2,276,382, dated March 17, 1942, and certain disadvantages which have been discovered in said patent apparatus are herein overcome.

The feeder of my invention includes a base 10 upon which a speed reducer 11 is mounted, which speed reducer is driven from an electric motor 12 also mounted on the base 10. Supported on top of the casing or housing of the speed reducer 11 is bracket means 13 which supports feeding apparatus designated generally by the reference character 14. Said feeding apparatus 14 includes a casting 15, the left-hand portion of which, as viewed in Figs. 1 and 2, forms the bottom plate 16 of a large storage receptacle 17.

It is obvious from Figs. 1 and 2 of the drawings that the casting 15 co-operates with the bottom plate 16 to form a dished bottom for the storage receptacle 17. Adjacent one side, the bottom plate 16 is provided with a feed opening 18 through which fine granular material within the receptacle 17 is discharged therefrom. To insure the proper discharge of material through the feed opening 18 there is an agitator 19 having a cone shaped hub 20 and a pair of generally radially extending arms which rotates in a substantially horizontal plane in the dish shaped bottom of said storage receptacle 17.

The agitator 19 is driven from the speed reducer 11 by a vertical or upright drive shaft 21 which is supported in spaced bearings below the bottom plate 16. The bottom of the cone shaped hub 20 is provided with a spiral type seal which tends to force material outwardly which may creep under it or between its bottom face and the opposite portion of the plate 16, thus preventing fine material reaching the bearings of the shaft 21.

The casting 15 includes a portion which extends to the right of the bottom plate 16, as viewed in Figs. 1 and 2 of the drawings, and provides a top plate 22 of an enclosing housing 23 of the feeding apparatus. The top plate 22 of the feeding apparatus is in effect a continuation of the bottom plate 16 of the storage receptacle 17.

In addition to the top plate 22, the housing 23 includes a generally cylindrically shaped side wall 24 and a bottom plate 25 which is substantially horizontal and parallel with the top plate 22 and spaced therefrom. Top and bottom plates 22 and 25 are provided with bearings which support a drive shaft 26 which drives a spider type or radial arm type scraper rotor 27 keyed to the shaft 26. Shaft 26 is driven from the shaft 21 by chain and sprocket drive mechanism 28 which may be readily removed so that the drive ratios between the shafts 21 and 26 may be readily adjusted. Tension adjusting mechanism 29 is associated with the chain of said drive mechanism 28.

The scraper rotor 27 includes a generally hollow hub 30 and a plurality of radially extending arms 31. As clearly illustrated in Fig. 4 of the drawings, the arms 31 are tapered to provide a decreasing cross-section from the top to the bottom so that they will aid in freely discharging material which is received through the feed opening 18 and scraped around and over the bottom plate 26 to a discharge opening 32 formed in said plate 25, which opening 32 is preferably diametrically opposite the feed opening 18 in top plate 22 or bottom plate 16.

Positioned below the discharge opening 32 is a small storage bin or chute 33, depending upon whether material is stored therein or is merely guided therethrough. In one arrangement of my invention I position a feeder, such as a vibratory feeder 34, directly below the storage bin 33 and in this arrangement I associate maximum and minimum level controls 35 and 36, respectively, with the storage bin 33. In other words, the controls 35 and 36 operate the driving motor 12 so as to maintain the material within the small storage bin 33 between predetermined limits, in a manner generally similar to that provided by the control of my above mentioned Patent No. 2,276,382, except that I use two controls instead of one. This is for the same purpose as that disclosed for maintaining a predetermined head on the deck of the feeder of said patent. It is to be understood that the feeder 34 of this application may follow that of the feeder 81 of said Patent No. 2,276,382.

In other installations the device 33 will act only as a chute and the level controls 35 and 36 will be eliminated, the material merely flowing through the chute 33 by gravity to some desired receptacle rather than being stored therein.

It may further be pointed out that in addition to the taper of the arms 31, the hub 30 is tapered, as clearly illustrated in Fig. 2 of the drawings, and decreases in diameter from the top to the bottom also to assist the free discharge of material as it reaches the discharge opening 32.

Directly above the discharge opening 32 and formed in the top plate 22 I provide a breather 37 which is simply an opening in said top plate 22 covered by a screen cloth or mesh and which will allow a free flow of air therethrough. This allows material to fall freely through the opening 32 without causing "puffing" which has otherwise been found to occur, which "puffing" tends to aerate the fine material undesirably and prevent its proper conveying by the feeder 34, since very fine, granular, aerated or "puffed" material tends merely to boil on the deck of a vibratory feeder rather than be conveyed along in the proper manner.

By comparing certain features of the feeding apparatus above described with that of my above-mentioned Patent No. 2,276,382, its advantages will be appreciated. First of all, it is to be noted that the agitator and the feeder rotor are driven by separate shafts instead of by a common shaft or axially aligned shafts, as in my prior patented structure. One of the advantages of this is that it makes for better protection of the upper bearing of the shaft 21 by the material ejector spiral seal on the bottom of the cone 20 above described. Also it makes possible a variation in speed of rotation of the scraper rotor 27 as compared with the speed of rotation of the agitator 19, since this ratio may be adjusted in the device of this application by adjusting the size of one or more of the sprockets of the drive mechanism 28.

Furthermore, what is of considerable practical importance is the fact that the material which is trapped between adjacent arms 31 of the rotor 27, thus isolating it from the material in the container 17, is conveyed radially away from the vertical axis of the container 17 by the rotor 27. Contrary to this, in the device of my previous Patent No. 2,276,382, the material is merely conveyed from one side of the axis of the storage receptacle to the other side by the isolating rotor. This has as a resulting important advantage that of making it possible to provide the receptacle or chute 33 with substantially vertical or upright side walls. Thus there is a greatly reduced tendency for material to adhere by friction to any parts after it is discharged by the rotor 27. In other words, the sloping side wall of the discharge chute 113 of my former patented device has been eliminated.

Another important advantage of the instant device is the construction of the rotor 27 with the tapered arms 31 and tapered drum 30 which increases the horizontal cross-sectional area through which particles fall as they travel downwardly under the influence of gravity away from the rotor 27 which is particularly important as the material is discharged through discharge opening 32, thus reducing appreciably any tendency for the material to adhere to the rotor 27. The breathing device 37 also has an advantage which was above described, there being nothing comparable with this in my patented device.

In the operation of the device, fine granular material, which might otherwise tend to run if delivered directly to the feeder 34, is stored in the receptacle 17. This granular material under the influence of gravity and of the agitator 19 will drop through the opening 18 into the generally cylindrical housing 23, being supported on the bottom plate 25. The material will be scraped over the bottom plate 25 to a position diametrically opposite that at which it is received, the material being isolated or sectionalized between two arms 31 of the rotor 27, thus permitting only that material to flow to the small storage bin 33 which is positively delivered thereto by said rotor 27. This, of course, isolates the bin 33 from the large storage hopper 17 and limits the head of granular material on the deck of the feeder 34 which has been found essential to prevent uncontrolled running or water-like flowing of certain fine granular materials.

As the material between adjacent arms 31 reaches the discharge opening 32 it is freely discharged therethrough with a minimum tendency for it to adhere either to the rotor 27 or thereafter to the side walls of the small storage hopper or chute 33, since they are all substantially vertical or upright. Thus the head of granular material on the feeder 34 is maintained within certain predetermined limits within which it will not flow unless the feeder 34 is energized or vibrated.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Feeding apparatus for fine granular material including a storage receptacle, a substantially horizontal bottom plate for said storage receptacle having a hole therein through which material can drop, means for receiving granular material which drops through the hole in said bottom plate and conveying it horizontally to a discharge position diametrically opposite from the receiving position, said means including a rotary conveyor having a cylindrical housing with substantially horizontal top and bottom plates, the top plate of which is substantially a continuation of the aforementioned storage receptacle bottom plate and is spaced laterally therefrom whereby the aforementioned hole in said storage receptacle bottom plate is also a feed hole in the rotary conveyor top plate, said rotary conveyor also including a rotor mounted on an upright drive shaft, said rotor having radially extending scraper arms adapted to scrape material received from said hole and over the conveyor housing bottom plate to a substantially diametrically positioned discharge hole in said conveyor housing bottom plate, said rotor arms being tapered to provide a decreasing cross-section from the top to the bottom thereby to aid the discharge of material, and a small capacity storage hopper located directly below said discharge hole and having all of its walls substantially vertical to provide a minimum resistance to flow of granular material thereover.

2. Feeding apparatus for fine granular material including a storage receptacle, a substantially horizontal bottom plate for said storage receptacle having a hole therein through which material can drop, and means for receiving granular material which drops through the hole in said bottom plate and conveying it horizontally to a discharge position diametrically opposite from the receiving position, said means including a rotary conveyor having a cylindrical housing with substantially horizontal top and bottom plates, the top plate of which is substantially a continuation of the aforementioned storage receptacle bottom plate and is spaced laterally therefrom whereby the aforementioned hole in said storage receptacle bottom plate is also a feed hole in the rotary conveyor top plate, said rotary conveyor also including a rotor mounted on an upright drive shaft, said rotor having radially extending scraper arms adapted to scrape material received from said hole and over the conveyor housing bottom plate to a substantially diametrically positioned discharge hole in said conveyor housing bottom plate, said rotor arms being tapered to provide a decreasing cross-section from the top to the bottom thereby to aid the discharge of material.

EARLE V. FRANCIS.

REFERENCES CITED

The following references are of record in the file of this patent:

UNITED STATES PATENTS

| Number | Name | Date |
|---|---|---|
| 31,530 | Cluxton | Feb. 26, 1861 |
| 1,457,038 | Lane et al. | May 29, 1923 |
| 1,736,243 | Bailey | Nov. 19, 1929 |
| 2,276,382 | Francis | Mar. 17, 1942 |